US006965885B2

(12) United States Patent
Gutta et al.

(10) Patent No.: US 6,965,885 B2
(45) Date of Patent: Nov. 15, 2005

(54) SELF-ORGANIZING FEATURE MAP WITH IMPROVED PERFORMANCE BY NON-MONOTONIC VARIATION OF THE LEARNING RATE

(75) Inventors: Srinivas Gutta, Yorktown Heights, NY (US); Vasanth Philomin, Hopewell Junction, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 391 days.

(21) Appl. No.: 10/055,352

(22) Filed: Jan. 22, 2002

(65) Prior Publication Data

US 2003/0140019 A1 Jul. 24, 2003

(51) Int. Cl.[7] ............................. G06E 1/00; G06E 3/00; G06F 15/18; G06G 7/00
(52) U.S. Cl. ............................. 706/26; 706/25; 706/16
(58) Field of Search ............................. 706/26, 25, 16

(56) References Cited

U.S. PATENT DOCUMENTS

| | | | | |
|---|---|---|---|---|
| 5,235,673 A | * | 8/1993 | Austvold et al. | 706/44 |
| 5,479,576 A | * | 12/1995 | Watanabe et al. | 706/25 |
| 5,809,490 A | | 9/1998 | Guiver et al. | 706/16 |
| 5,819,245 A | * | 10/1998 | Peterson et al. | 706/16 |
| 5,933,818 A | * | 8/1999 | Kasravi et al. | 706/12 |
| 6,018,696 A | * | 1/2000 | Matsuoka et al. | 701/207 |
| 6,173,275 B1 | * | 1/2001 | Caid et al. | 706/14 |
| 6,477,469 B2 | * | 11/2002 | Ye et al. | 702/11 |
| 6,578,021 B1 | * | 6/2003 | Barillaud | 706/20 |
| 2001/0034686 A1 | * | 10/2001 | Eder | 705/36 |
| 2002/0091489 A1 | * | 7/2002 | Ye et al. | 702/6 |

OTHER PUBLICATIONS

Kishan Mehrotra et al, Artificial Neural Networks, 1997, MIT, 188–195.*
Teuvo Kohonen, Self–Organizing Maps of Massive Document Collections, 2000, IEEE, 0–7695–0619–4/00, 3–9.*
Teuvo Kohonen, The Self–Organizing Map, Sep. 1990, IEEE, vol. 78, No. 9, 1464–1480.*
Schnitman et al, "An Efficient Implementation of a Learning Method for Mamdani Fuzzy Models", Proceedings Sixth Brazilian Symposium on Neural Networks, Rio de Janeiro, Brazil, Nov. 2000, Los Alamitos, CA, USA, IEEE Comput. Soc. USA 2000, pp. 38–43, XP0010527545.

* cited by examiner

Primary Examiner—Joseph P. Hirl
(74) Attorney, Agent, or Firm—Gregory L. Thorne

(57) ABSTRACT

The learning rate used for updating the weights of a self-ordering feature map is determined by a process that injects some type of perturbation into the value so that it is not simply monotonically decreased with each training epoch. For example, the learning rate may be generated according to a pseudorandom process. The result is faster convergence of the synaptic weights.

14 Claims, 3 Drawing Sheets

SELF-ORGANIZING FEATURE MAP WITH IMPROVED PERFORMANCE BY NON-MONOTONIC VARIATION OF THE LEARNING RATE

FIELD OF THE INVENTION

The invention relates to Self-Organizing Feature Maps (SOFM) which are neural networks that transform an input of arbitrary dimension into a one or two dimensional discrete map subject to a topological (neighborhood preserving) constraint and more particularly to such SOFMs in which the initial values of the weight vectors are random.

BACKGROUND

Neural networks occupy a large branch of research in machine intelligence. Artificial neural networks are information-processing devices inspired by the interconnected, parallel structure of animal brains. They take the form of software or hardware networks having collections of mathematical models that emulate some of the observed characteristics of nervous systems and analogies to adaptive biological learning. Generally, they are composed of large numbers of interconnected processing elements, which can be realized in software or hardware, that are analogous to the neurons of an animal brain. The connections between these processing elements are weighted in a fashion believed to be analogous to synapses.

Training a neural network involves making adjustments to the "synaptic" connections that exist between the neurons (i.e., the values of the weights). Training is performed by exposure to a set of input/output data where the training algorithm iteratively adjusts the connection weights. These connection weights store the knowledge necessary to solve specific problems.

Neural networks are being applied to greater and greater numbers of practical problems, including very complex ones. They are particularly suited to pattern recognition and classification problems having many inputs such as speech recognition, character and signal recognition, and functional prediction and system modeling where the physical processes are not understood or are highly complex.

There are many types of neural networks. Some of the more popular include the multilayer perceptron, which is generally trained with the backpropagation of error algorithm, learning vector quantization, radial basis function, Hopfield, and SOFM. Some are classified as feedforward and others as recurrent (i.e., implement feedback) depending on how data is processed through the network. Another feature of neural networks is the mechanism by which it is trained. Some use a technique called supervised training while others are referred to as unsupervised or self-organizing. In supervised training, the network is guided by an instruction process while in unsupervised algorithms the data is clustered into similar groups based on the attributes that provide the inputs to the algorithms.

The SOFM or Kohonen artificial neural network is a type of unsupervised neural network. In unsupervised learning, an untrained neural network is exposed to examples or input vectors and internal parameters adjusted. In SOFMs, all the neurons of the network receive the same input. The nodes engage in competition with their neighbors and at each stage of a self-learning process, the one with most activity "wins." Learning is based on the concept of winner neurons.

Unsupervised learning allows the objects to be grouped together on the basis of their perceived closeness in n-dimensional hyperspace (where n is the number of variables or observations made on each object). Such methods, then, although in some sense quantitative, are better seen as qualitative since their chief purpose is merely to distinguish objects or populations.

Referring to FIG. 1, SOFMs provide an objective way of classifying data through self-organizing networks of artificial neurons. There are two layers, an input layer 110 and a competition layer 100. Each node of the input layer may be connected (as indicated by connectors 120) to the entire set of nodes in the competition layer. In an example configuration, each neuron may be connected to its eight nearest neighbors on a grid. The neurons store a set of weights (a weight vector) each of which corresponds to one of the inputs in the data. The objective of a Kohonen network is to map input vectors (patterns) of arbitrary dimension N onto a discrete map lying in a competition layer of arbitrary dimension, but typically of 1 or 2 dimensions. The algorithm adjusts weights so that patterns close to one another in the input space should be close to one another in the map: they should be topologically ordered.

The learning process is as follows: First, the weights for each output unit are initialized, typically to random starting values. An iterative process is performed that end when weight changes are negligible. For each of a number of input patterns a winning output node and all units in the neighborhood of the winner are identified and the weight vectors for all of these nodes updated. The winning output unit is simply the unit with the weight vector that has the smallest Euclidean distance to the input pattern. The neighborhood of a unit is defined as all units within some distance of that unit on the map (not in weight space). If the size of the neighborhood is 1 then all units no more than 1, either horizontally or vertically, from any unit fall within its neighborhood. The weights of every unit in the neighborhood of the winning unit (including the winning unit itself) are updated such that each unit in the neighborhood is moved closer to the input pattern. As the iterations are performed, the learning rate is reduced. If the parameters are well chosen the final network should capture the natural clusters in the input data.

The factor that governs the size of the weight alterations is known as the learning rate. The adjustments to each item in the weight vector are made in accordance with the following:

$$\Delta W_{i,j} = \alpha (I_j - W_{i,j}) \sin d/(2d)$$

where $W_{I_j}$ is the $j^{th}$ weight of the $i^{th}$ node, $\alpha$ is the learning rate, $I_j$ is the $j^{th}$ component of the input vector, and d is the distance between the current node and the winner. The above formula is one of a number that are known in the prior art and the invention to be discussed in subsequent section could make use of it or any other. As mentioned, the process of training continues until the changes in the weights falls below some predetermined value in successive iterations.

The effect of the "learning rule" (weight update algorithm) is to distribute the neurons evenly throughout the region of n-dimensional space populated by the training set. The neuron with the weight vector closest to a given input pattern will win for that pattern and for any other input patterns that it is closest to. Input patterns which allow the same node to win are then deemed to be in the same group, and when a map of their relationship is drawn a line encloses them. In the resulting map, it is possible to examine closely relationships between the items in the training set and visualize these relationships even for complex structures in high-dimensional input spaces.

There are two phases to the process of generating a solution. In an initial first stage, in the prior art, the learning rate begins at a high value close to unity and is gradually monotonically decreased. The rate of decrease may be exponential, linear, or some other and according to the prior art, the particular pattern has not generally been regarded as particularly important. During the initial phase, called the "ordering phase" the topological ordering of the weight vectors takes place. A long convergence phase follows and is associated with fine-tuning of the map. The learning rate is maintained at low values (well below 0.1, for example) and monotonically and progressively decreased with each iteration.

The quality of a SOFM solution for any given problem is by no means assured. Where the input vectors are high-dimensional and complex, results may take a very long time to converge and may even produce poor end results.

SUMMARY OF THE INVENTION

In a SOFM, rather than reduce the learning rate monotonically during progression of the iteration process, the learning rate is selected in a random or sporadic fashion. It has been found experimentally that this increases the rate of convergence in many instances. According to the prior art, the learning rate should be time-varying, but decreased monotonically. However, it has been discovered that, at least in some contexts, particularly in the case of higher dimensional input spaces, sporadic variation of the learning rate, at least during the initial stages, leads to improved performance.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
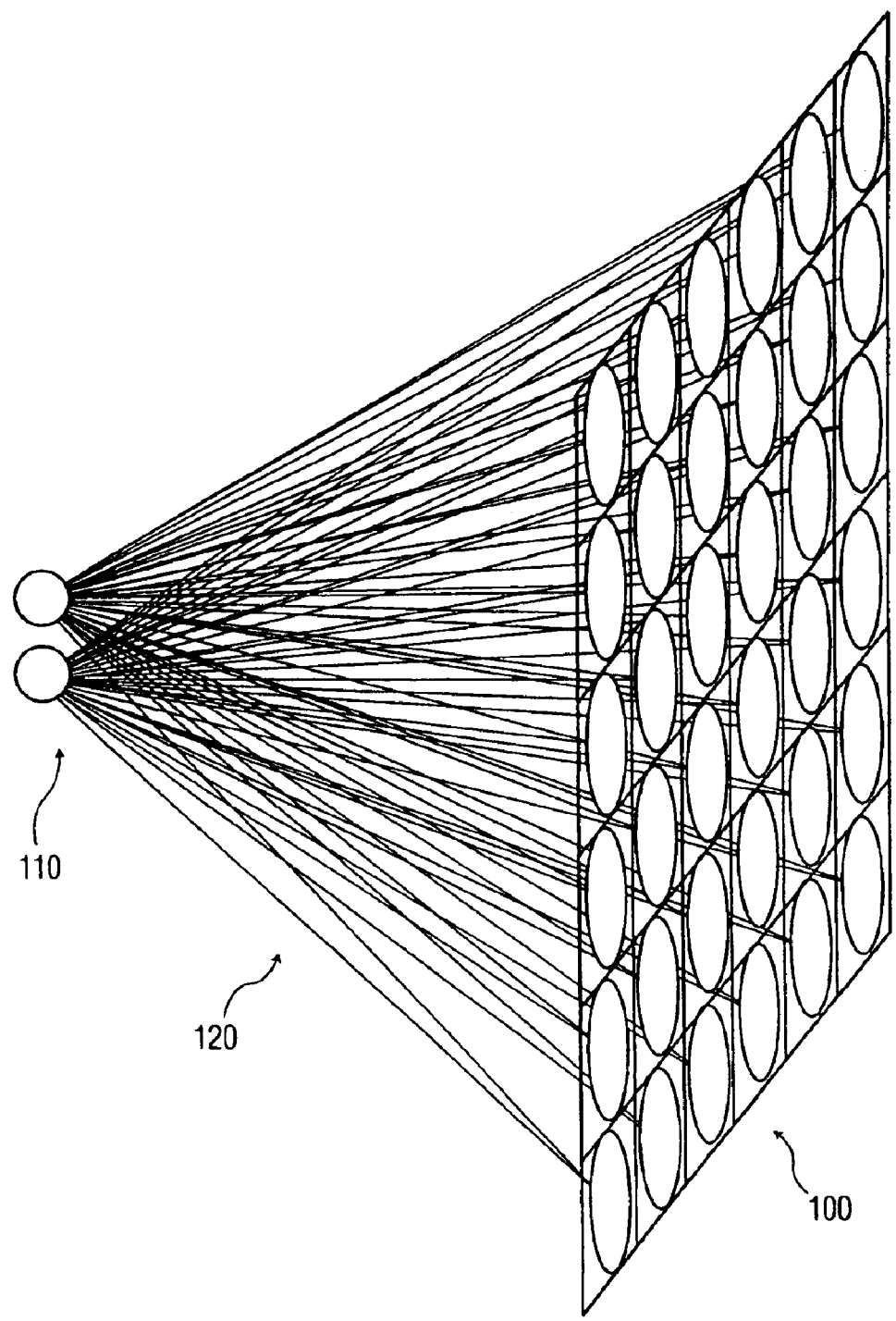
FIG. 1 is a diagrammatic representation of a self ordering feature map according to the prior art and consistent with embodiments of the invention.
Figure 2:
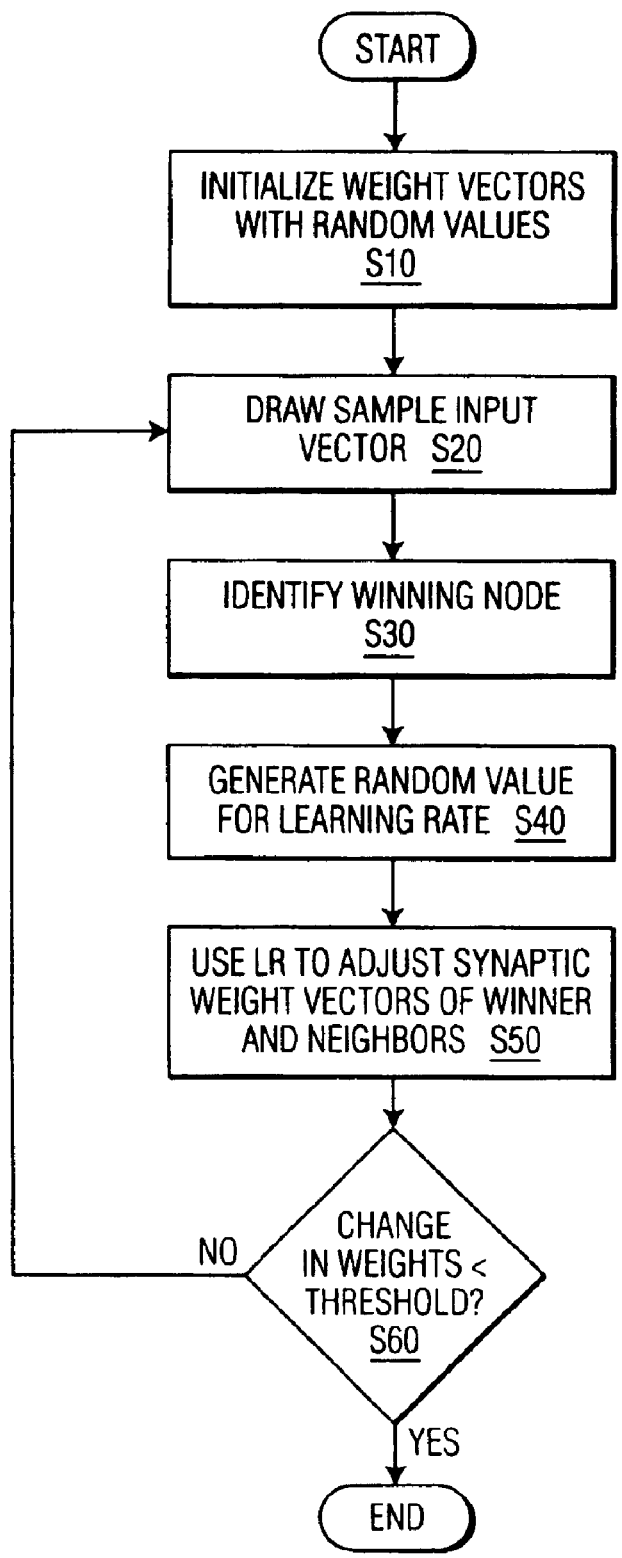
FIG. 2 is a flow chart representing an algorithm for implementing the invention according to an embodiment thereof.

Referring to FIG. 2, an algorithm for implementing the invention begins with the initialization of the weight vectors in step S10. Random values for all of the weight vectors is a typical choice. In step S20, a sample input vector is drawn at random from a pool of input vectors being used for training the SOFM. The selected vector is applied to the input nodes and a winning competition layer node is identified in step S30 according to a minimum Euclidean distance value:

$$D_i = \sqrt{\sum_{j=1}^{n}(I_j - W_{i,j})^2}$$

where $W_{ij}$ is the $j^{th}$ weight of the $i^{th}$ node, $I_j$ is the $j^{th}$ component of the input vector, and $D_i$ is the distance of the $i^{th}$ node. The node with the lowest distance value is the winner. In step S40, a random value of the learning rate is generated. This learning rate is used to update the weights of the winning node and neighboring nodes.

In step S50, the winning node and all neighborhood nodes are then updated according to the following formula.

$$\Delta W_{i,j} = \alpha(I_j - W_{i,j}) \sin d/(2d)$$

where $W_{ij}$ is the $j^{th}$ weight of the $i^{th}$ node, $\alpha$ is the random learning rate, $I_j$ is the $j^{th}$ component of the input vector, and d is the distance between the current node and the winner. As mentioned, this process of training continues until the changes in the weights falls below some predetermined value in successive iterations. The test is made in step S60.

Note that the above formulas are examples for purposes of describing an embodiment. There are other formulas that may be used for updating the weights and the invention is not limited to any particular one.

Figure 3:
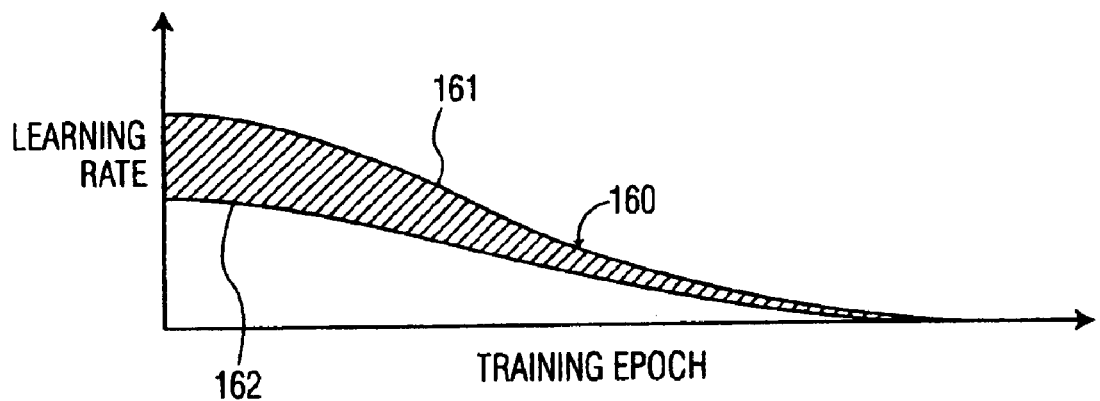
FIG. 3 is an illustration of selective random generation of learning rate parameters with progress of training of a SOFM.

Referring now to FIG. 3, the generation of successive values of the learning rate can be performed in various ways consistent with the present invention. Preferably, the values over which the random rates range should become smaller as the simulation progresses. In one example embodiment illustrated in FIG. 3, the learning rate is a random value between bounds 161 and 162 which decrease gradually as the training process progresses. This need not be a monotonic reduction in range, as illustrated at 160 in FIG. 3, but the learning rates preferably get smaller in value, and range over a smaller range, as the simulation progresses. In another embodiment, the learning rate is varied in a similar range 160, but is varied cyclically or pseudorandomly. Preferably, the learning rate varies around unity initially and falls to values near zero decreasing by several orders of magnitude.

Figure 4:
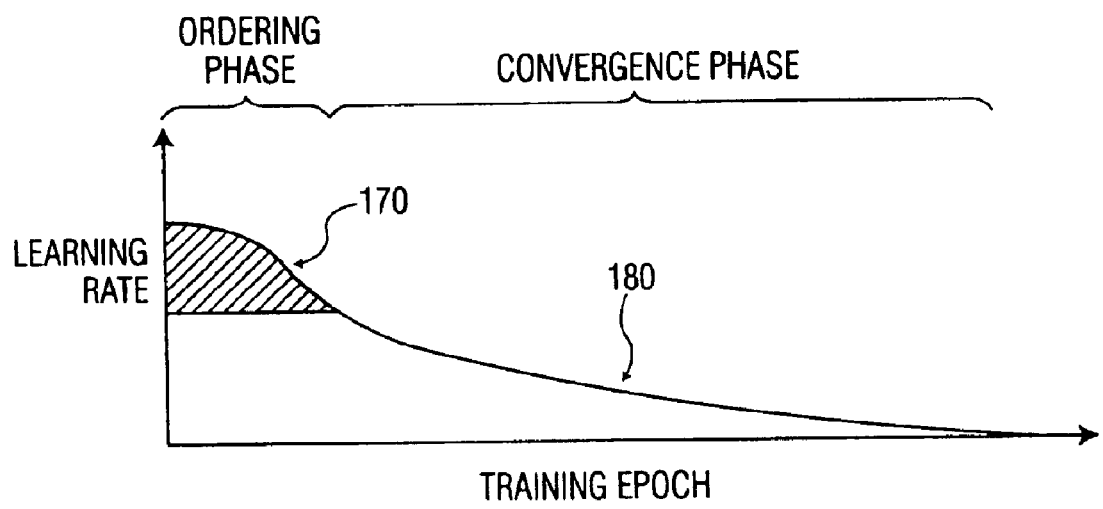
FIG. 4 is an illustration of another manner of selective random generation of learning rate parameters with progress of training of a SOFM.

Referring to FIG. 4, also, another alternative for generating may permit random variation (illustrated at 170) of the learning rate during the ordering phase of the training and switchover to monotonic reduction (illustrated at 180) of the learning rate for the convergence phase.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention.

We claim:

1. A method for training a self ordering map for use in a computing system, comprising:

initializing a set of weights of a self ordering map; and
   iteratively training the weights over many training epochs;

wherein
for at least a number of the training epochs, iteratively training the weights includes
updating the weights based on a learning rate that is generated according to a function that changes in a fashion that is other than monotonically decreasing with the training epoch.

2. A method as in claim 1, wherein
the function includes a random or pseudorandom function.

3. A method as in claim 2 wherein
the random or pseudorandom function has a range that decreases with the training epochs.

4. A method as in claim 2 wherein
the random or pseudorandom function is configured such that the learning rate tends to decrease with the training epochs.

5. A method as in claim 1 wherein
the function has a range that decreases with the training epochs.

6. A method as in claim 5 wherein
the function is configured such that the learning rate tends to decrease with the training epochs.

7. A method as in claim 1 wherein
the function is configured such that the learning rate tends to decrease with the training epochs.

8. A method of training a self ordering feature map for use in a computing system, comprising
choosing a random value for initial weight vectors;
drawing a sample from a set of training sample vectors and applying it to input nodes of the self ordering feature map;
identifying a winning competition node of the self ordering feature map according to a least distance criterion;
adjusting a synaptic weight of at least the winning node, using a learning rate to update the synaptic weight that is based on a function other than one that is monotonic with subsequent training epochs;
iteratively repeating the drawing, identifying, and adjusting to form each subsequent training epoch.

9. A method as in claim 8, wherein
the function corresponds to a random or pseudorandom function.

10. A method as in claim 9 wherein
the function has a range that decreases with subsequent training epochs.

11. A method as in claim 9 wherein
the function is configured such that the learning rate tends to decrease with subsequent training epochs.

12. A method as in claim 8 wherein
the function has a range that decreases with subsequent training epochs.

13. A method as in claim 12 wherein
the function is configured such that the learning rate tends to decrease with subsequent training epochs.

14. A method as in claim 8 wherein
the function is configured such that the learning rate tends to decrease with subsequent training epochs.

* * * * *